Figure 1:
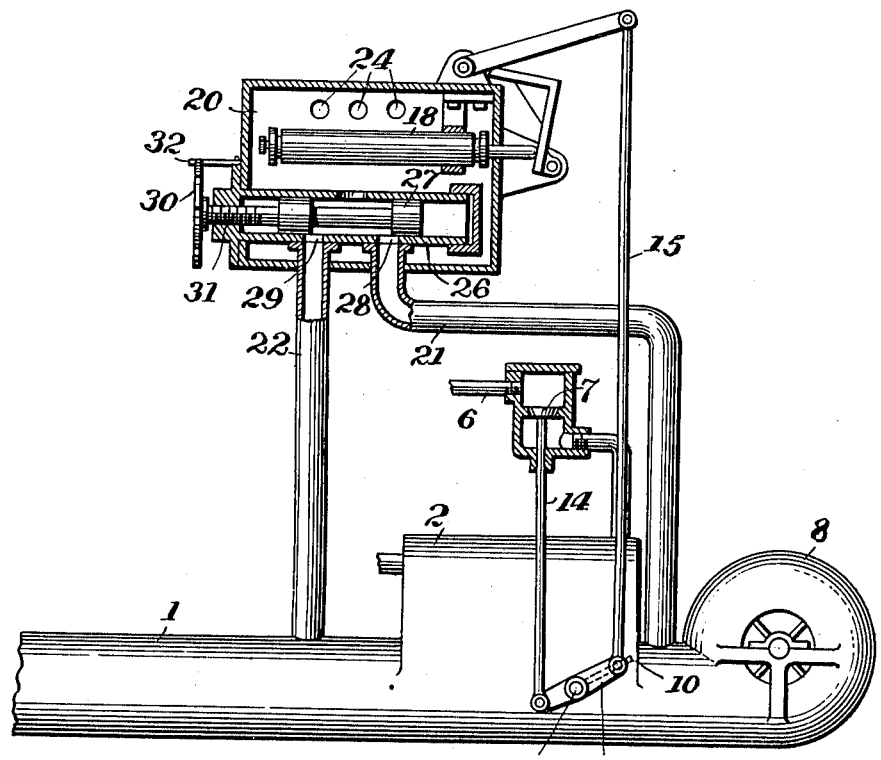

H. G. GEISSINGER.
COMPENSATING SYSTEM OF TEMPERATURE CONTROL.
APPLICATION FILED MAR. 7, 1910.

1,022,188.

Patented Apr. 2, 1912.

2 SHEETS—SHEET 1.

Witnesses

Inventor
H.G. Geissinger
by
Eugene C. Brown
Attorneys

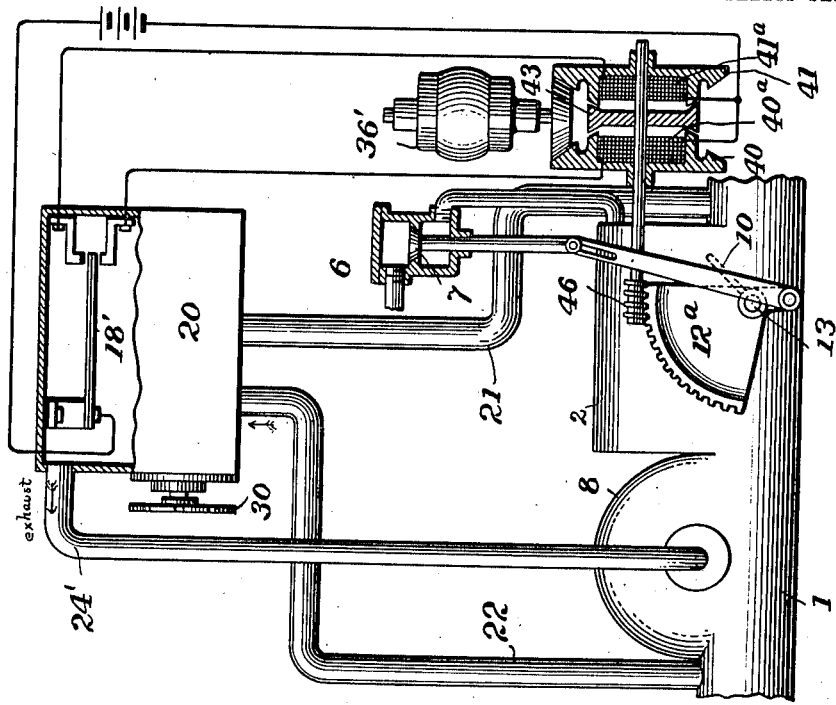
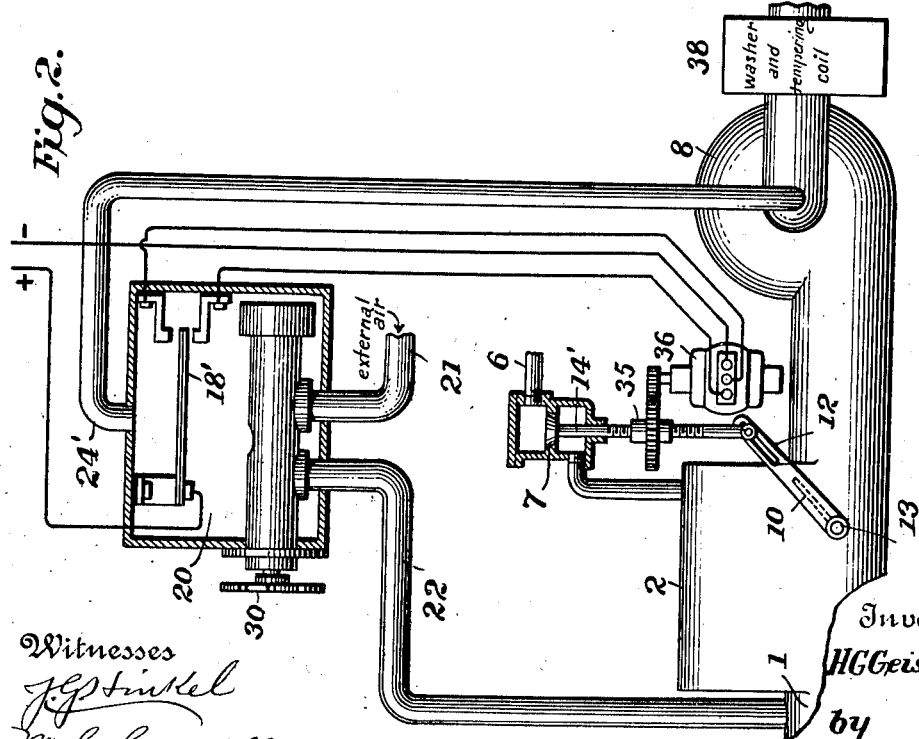

UNITED STATES PATENT OFFICE.

HARRY G. GEISSINGER, OF NEW YORK, N. Y., ASSIGNOR TO GEISSINGER REGULATOR COMPANY, OF NEW YORK, N. Y., A CORPORATION OF NEW YORK.

COMPENSATING SYSTEM OF TEMPERATURE CONTROL.

1,022,188. Specification of Letters Patent. Patented Apr. 2, 1912.

Application filed March 7, 1910. Serial No. 547,749.

*To all whom it may concern:*

Be it known that I, HARRY G. GEISSINGER, a citizen of the United States, residing at New York, in the county of New York and State of New York, have invented new and useful Improvements in Compensating Systems of Temperature Control, of which the following is a specification.

My invention relates to a system for controlling the temperature of compartments or buildings in which a compensation for variations in the external air is produced automatically.

The object of my invention is to vary the proportions of the component currents of modified and unmodified air which are mingled to produce the resultant temperature in accordance with the temperature changes which take place in the external atmosphere and also to regulate the supply of the temperature-changing medium.

The method of temperature control disclosed herein is applicable to the usual installations of indirect forced air circulation and may be applied to either a cooling or refrigerating system or to a system of heating, and I have selected the latter for purposes of illustration. In many such installations, it is not deemed feasible to regulate each room supplied from the heating equipment with a thermostat, and inasmuch as the heat required is directly proportioned to the difference in temperature between that desired in the room or compartment and that of the external atmosphere, the result may be secured with reasonable accuracy by supplying hot air of a temperature depending upon the external conditions. Thus, if it be found that hot air at a temperature of 80° will keep the average room at 70° when the external temperature is 60°, then the hot air elevation is also equal to the external depression at any other temperature. For the purpose of obtaining this compensation for the temperature of the external air necesary to produce the desired temperature in a certain compartment, I immerse a controlling thermostat in an artificial atmosphere of the desired temperature which is composed of adjustable proportions of hot air as furnished to the rooms and external air. Thus in the example cited, a thermostat adjusted to maintain a temperature of 70° supplied with an equal volume of hot and external air will raise the hot air to a degree above 70° equal to the depression of the cold external air.

My invention will be more clearly understood from the following description in connection with the accompanying drawings, in which—

Figure 4:
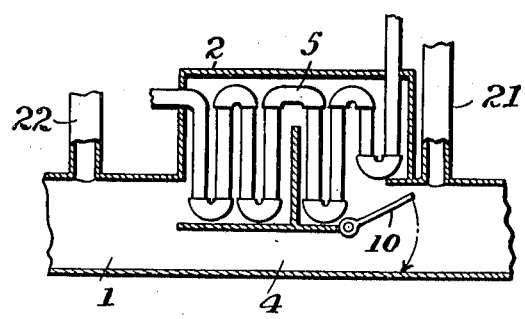

Figure 1 shows the application of my invention to a thermostat immersed in an artificial atmosphere of the desired temperature, and arranged to mechanically control the proportions of hot and cold air admitted to the distributing air-duct and simultaneously by controlling the flow of steam to the heater; Fig. 2 shows another embodiment of my invention, in which the thermostat is arranged to control the electric circuits by which the valve mechanism is actuated; Fig. 3 shows an embodiment of my invention in which the thermostat controls the electric clutches of the valve-actuating mechanism; and Fig. 4 is a detail view of a heater construction.

In the arrangement illustrated in Fig. 1, the main distributing air-duct or conduit 1, receives the currents of hot air from the heater chamber 2 and the cold air which is shunted around the heater through the by-pass 4. The heat may be supplied by heating coils 5, supplied from a pipe 6 and controlled by the valve 7. The air is drawn from the external atmosphere by the blower 8, and forced through the heater and by-pass in proportions depending upon the position of the damper 10, which shuts the heater passage in its uppermost position and closes the by-pass in its lowest position. A lever arm 12 is pivoted at 13 to the arbor of the damper and at one end to the valve rod 14, the other end of the lever arm being connected to the link 15, pivoted to the lever mechanism of the thermostat 18. I have shown an ordinary form of tubular thermostat comprising tubes having different coefficients of thermic expansion, and the free end of the inner tube actuating the system of multiplying levers connected with the link 15.

In order that the thermostat may be subjected to the temperature which it is desired should be maintained in the room or compartment supplied by the distributing air-duct, I immerse the thermostat in an artificial atmosphere of the desired temperature by inclosing it in an insulated chamber 20, connected with the cold air or external supply by means of a pipe 21 and with the heated air as supplied to the rooms by means of the pipe 22, the circulation being maintained through the exhaust ports 24 leading from the chamber. In order that the proportions of hot and cold air entering the chamber 20 may be regulated, the pipes 21, 22, are connected with the casing 26, having a valve 27 controlling the inlet ports 28, 29, and which may be adjusted longitudinally by the gage-lever 30, connected with the screw stem 31, a spring 32 serving to lock the same in any position. An indicating dial may be conveniently arranged behind the gage-lever.

Now it will be evident that the temperature in the chamber 20 will vary with the position of the valve 27, determining the ratio of the hot and cold air admitted through the ports 28, 29. This ratio will depend upon the especial conditions of each installation, but when once determined will remain fixed. Let it be supposed that it is desired to maintain the temperature in the average room at 70°, then the gage-lever 30 is turned until the valve 27 is in such a position that the mixture of cold and hot air entering the chamber 20, will produce an artificial temperature of 70°, and the ratio of cold and hot air will depend upon the difference in temperature between the hot air and the external air at the time indicated. The thermostat in the chamber 20 having been adjusted for 70°, it will move the damper to a certain position such that the proportion of air passing through the heater and the by-pass respectively, will cause the air in the distributing pipe to have a resultant temperature such that the number of degrees above 70° will just compensate for the number of degrees the external atmosphere is depressed below said desired temperature.

As previously pointed out, when the valve has been properly adjusted for one condition in any installation, the compensation will then be made automatically for any other temperature. This will be apparent at once, since if the temperature of the external air drops, say 5°, then the temperature of the artificial atmosphere in the chamber 20, by reason of the colder air entering through the pipe 21, will fall, and this would cause the thermostat to change the position of the damper and steam valve to immediately compensate for the change. The damper 10 would be opened to admit more air through the heater and less would be shunted through the by-pass. In practice this change would take place with every slight change in the external conditions, the mechanism responding in a manner to maintain the temperature in the chamber 20 at the standard temperature and the temperature of the hot air supplied by the distributing air-duct changing automatically to supply the proper compensating temperature.

In Fig. 2, I have shown another arrangement embodying my invention, in which an electric compound bar thermostat controls the electric circuits of the valve actuating mechanism. I have shown the damper lever 12 connected to the valve stem 14′ which is reciprocated longitudinally by means of a nut 35 geared to a reversible electric motor 36, the direction of motion being controlled by the thermostat 18′ contacting with one or the other of its contacts. I have shown the exhaust from the chamber 20 connected with the blower 8 by a pipe 24′. I have also shown the external air entering the blower through a washing chamber 38 which may contain the tempering coils usually associated with this arrangement.

It is sometimes desirable to locate the blower between the heater and the distributing air-duct as illustrated in Fig. 3. In this figure I have illustrated another manner of controlling the valve and damper operating mechanism. The actuating motor 36′ may operate continuously in the same direction, turning the bevel gears 40, 41, in opposite directions. Within each of said gears is a magnetizing coil 40$^a$, 41$^a$, adapted when energized to clutch the disk 43, mounted upon the worm-shaft 44, and causing said shaft to rotate in one direction or the other, the control being effected by the position of the thermostat 18′ against the corresponding contacts. The damper 10 and the valve 7 may be operatively connected to a segment gear 12$^a$ in mesh with the worm 46.

The screw and nut motor connection shown in Fig. 2, and the magnetic clutch arrangement shown in Fig. 3, are old and well known forms of connecting operating parts with the driving motor, and it is obvious that many other arrangements may be used, these being adopted merely for purposes of illustration. I may also employ any of the well-known pneumatic systems of thermostatic control.

For purposes of illustration, in order to explain the principles of my invention, I have described somewhat in detail several different mechanical arrangements in which it may be embodied, but it is to be understood that there are many other ways of carrying out this invention.

While I have referred to a heating system in the previous description, it is obvious to engineers that this invention is equally applicable to the control of cooling or refrigeration systems and I intend to include the same within the scope of my claims. Moreover, it will be understood that this invention is not limited to any particular temperature-changing medium, but that any desired heating or cooling medium may be employed.

Having thus set forth the principles of my invention and the manner in which it may be embodied, I claim—

1. A temperature controlling apparatus including hot and cold air ducts, a mixed air conduit, a mixing damper arranged to close or partially close either of the said ducts for varying the relative volumes of the air delivered to the mixed air conduit, a thermostat having a casing, mechanism controlled by the thermostat for actuating the damper, and a duct extending from the thermostat casing to the mixed air conduit.

2. A temperature regulating system comprising means for regulating the temperature of air supplied to an air-duct leading to a compartment to be maintained at a certain temperature, a heat-insulating casing or chamber isolated from the influence of the temperature in the compartment to be regulated and located at a distance from said air-duct, a thermostat controlling said regulating means and located within said chamber, means for supplying said chamber with currents of warm and cold air respectively which will produce a resultant temperature the same as that to be maintained in said compartment, and means for varying the ratio of said warm and cold air currents to suit the differing conditions of separate installations.

3. In a temperature regulating system having a heating conduit, means for subjecting said conduit to a temperature-changing medium, a thermostat controlling said means and located at a distance from the rooms or compartment in which the temperature is to be regulated and from said conduit, a heat-insulating casing or chamber surrounding said thermostat, means for supplying said chamber with currents of air of different temperatures which will produce a resultant temperature which is the same as that desired to be maintained in the rooms or compartment, and means for varying the ratio of said air currents to suit the conditions of any installation.

4. A temperature regulating system comprising a temperature-changing device, means for regulating the temperature-changing medium supplied thereto, a thermostatic controller for said regulating means isolated from the influence of the temperature of the rooms to be regulated and located at a distance from said temperature-changing device, a heat insulating casing surrounding said controller, and means for subjecting said controller to an artificial atmosphere having the desired temperature of the rooms or compartment to be regulated.

5. A temperature regulating system comprising a temperature-changing device, a distributing air-duct connected therewith having a damper to control the air currents therethrough, means for regulating the temperature-changing medium supplied to said device, a thermostatic controller for said damper and said regulating means isolated from the influence of the temperature of the rooms to be regulated and located at a distance from said temperature-changing device, a heat insulating casing surrounding said controller, and means for subjecting said controller to an artificial atmosphere having the desired temperature of the rooms or compartment to be regulated.

6. In a temperature regulating system having a heat-conveying conduit, means for subjecting said conduit to a temperature-changing medium, a heat-insulating casing or chamber protecting its interior from the heat of the surrounding atmosphere and located at a distance from said conduit, a controlling thermostat for controlling said means and located in said casing, and means for supplying said chamber with air currents of different temperatures which will produce a resultant temperature the same as that desired to be maintained by the system.

7. In a temperature regulating system having a heat-conveying conduit, means for subjecting said conduit to a temperature-changing medium, a heat-insulating casing or chamber protecting its interior from the heat of the surrounding atmosphere and located at a distance from said conduit, a controlling thermostat for controlling said means and located in said casing, means for supplying said chamber with air currents of different temperatures which will produce a resultant temperature the same as that desired to be maintained by the system, and means for varying the ratio of air currents supplied to the chamber.

8. In a temperature regulating system having a heat-conveying conduit, means for subjecting said conduit to a temperature-changing medium, a heat-insulating casing or chamber protecting its interior from the heat of the surrounding atmosphere and located at a distance from said conduit, a controlling thermostat for controlling said means and located in said casing, conduits for conveying different currents of air connected with openings or ports in said casing, and a valve for controlling said ports.

9. In a temperature regulating system having a heat-conveying conduit, means for subjecting said conduit to a temperature-changing medium, a heat-insulating casing or chamber protecting its interior from the heat of the surrounding atmosphere and located at a distance from said conduit, a controlling thermostat for controlling said means and located in said casing, conduits for conveying different currents of air connected with openings or ports in said casing, a valve for controlling said ports, and means for adjusting the position of said valve.

10. A temperature regulating system for maintaining a predetermined temperature in a desired locality, comprising a temperature-changer provided with an air-inlet with means for conveying a temperature-changing medium therethrough, a damper for said air-inlet, operating mechanism for said damper, a thermostat located at a distance from said locality and controlling said operating mechanism, a heat-insulating casing surrounding said thermostat, and means for subjecting said thermostat to an atmosphere having the same temperature as that to be maintained in said distant locality.

11. A temperature regulating system for maintaining a predetermined temperature in a desired locality, comprising a temperature-changer provided with an air-inlet with means for conveying a temperature-changing medium therethrough, a damper for said air-inlet, a valve for said temperature-changing medium, operating mechanism for said damper and said valve, a thermostat located at a distance from said locality and controlling said operating mechanism, a heat-insulating casing surrounding said thermostat, and means for subjecting said thermostat to an atmosphere having the same temperature as that to be maintained in said distant locality.

12. A temperature regulating system for maintaining a predetermined temperature in a desired locality, comprising a temperature-changer provided with an air-inlet with means for conveying a temperature-changing medium therethrough, a damper for said air-inlet, a valve for said temperature-changing medium, operating mechanism for said damper and said valve, a thermostat located at a distance from said locality and controlling said operating mechanism, a heat-insulating casing surrounding said thermostat, and means for subjecting said thermostat to an atmosphere having the same temperature as that to be maintained in said distant locality.

13. A temperature regulating system for maintaining a predetermined temperature in a certain locality, comprising a temperature-changer containing a conduit for a temperature-changing medium, a distributing air-duct connected with the temperature-changer and leading to said locality in which the temperature is to be regulated, an air-inlet connected to said temperature-changer and having a by-pass connecting with said air-duct, a damper controlling the air passing from the air-inlet into the temperature-changer and into the by-pass, operating mechanism for said damper, a thermostat located in an insulated casing or chamber and controlling said operating mechanism, pipes connecting said casing with the air-inlet and with the distributing air-duct respectively, and means for controlling the flow of air through said pipes.

14. A temperature regulating system for maintaining a predetermined temperature in a certain locality, comprising a temperature-changer containing a conduit for a temperature-changing medium, a valve controlling the flow of said medium, a distributing air-duct connected with the temperature-changer and leading to said locality in which the temperature is to be regulated, an air-inlet connected to said temperature-changer and having a by-pass connected with said air-duct, a damper controlling the air passing from the air-inlet into the temperature-changer and into the by-pass, operating mechanism for said valve and said damper, a thermostat located in an insulated casing or chamber and controlling said operating mechanism, pipes connecting said casing with the air-inlet and with the distributing air-duct respectively, and an adjustable valve for controlling the flow of the air through said pipes.

15. A temperature regulating system comprising a temperature-changing device for supplying warm air-currents, a distributing air-duct connected therewith and with a supply of cool air-currents, a thermostat controlling the relative amounts of said air-currents entering the air-duct, said thermostat being isolated from the influence of the air-duct and from the heating system supplied thereby, and means for subjecting said thermostat to a mixture of warm and cool air to produce a resultant effect in said air-duct to raise the temperature of the air-currents therein to a degree above the normal desired temperature proportional to the depression of the cool air.

In testimony whereof I have hereunto set my hand in presence of two subscribing witnesses.

HARRY G. GEISSINGER.

Witnesses:
LAURA E. SMITH,
MAMIE GOLDSTEIN.